US010627212B2

(12) United States Patent
Liu et al.

(10) Patent No.: US 10,627,212 B2
(45) Date of Patent: Apr. 21, 2020

(54) SWEPT-SOURCE OPTICAL COHERENCE TOMOGRAPHY (SS-OCT) PHASE STABILIZATION WITH REFERENCE SIGNAL CALIBRATION

(71) Applicant: KABUSHIKI KAISHA TOPCON, Tokyo (JP)

(72) Inventors: Jonathan J. Liu, New York, NY (US); Zhenguo Wang, Ridgewood, NJ (US); Jongsik Kim, Fort Lee, NJ (US); Kinpui Chan, Ridgewood, NJ (US)

(73) Assignee: KABUSHIKI KAISHA TOPCON, Tokyo (JP)

( * ) Notice: Subject to any disclaimer, the term of this patent is extended or adjusted under 35 U.S.C. 154(b) by 0 days.

(21) Appl. No.: 15/490,286

(22) Filed: Apr. 18, 2017

(65) Prior Publication Data
US 2017/0307353 A1    Oct. 26, 2017

Related U.S. Application Data

(60) Provisional application No. 62/327,233, filed on Apr. 25, 2016.

(51) Int. Cl.
*G01B 9/02* (2006.01)

(52) U.S. Cl.
CPC ..... *G01B 9/02091* (2013.01); *G01B 9/02069* (2013.01); *G01B 9/02071* (2013.01); *G01B 2290/60* (2013.01)

(58) Field of Classification Search
CPC ............ G01B 9/02028; G01B 9/02069; G01B 9/02071; G01B 9/02091; G01B 2290/60
See application file for complete search history.

(56) References Cited

U.S. PATENT DOCUMENTS

| 2003/0023153 | A1  | 1/2003 | Izatt et al. |
| 2009/0036782 | A1  | 2/2009 | Vakoc et al. |
| 2014/0028997 | A1* | 1/2014 | Cable ................. G01B 9/02091 356/51 |
| 2017/0074640 | A1* | 3/2017 | Cable ................. G01B 9/02083 |

OTHER PUBLICATIONS

Boy Braaf et al., "Phase-stabilized optical frequency domain imaging at 1-m for the measurement of blood flow in the human choroid", Optics Express, vol. 19, No. 21, Oct. 10, 2011, p. 20886, XP055091757, ISSN: 1094-4087, DOI:10.1364/OE.19.020886.
Extended European Search Report for European Application No. 17 16 7968 dated Jul. 13, 2017.

(Continued)

*Primary Examiner* — Michael A Lyons
(74) *Attorney, Agent, or Firm* — Pearne & Gordon LLP (57) ABSTRACT

A reference signal having a known induced optical delay is used for phase stabilization of optical coherence tomography (OCT) interferograms, and for correcting sampling differences within OCT interferograms, in single mode and multimodal OCT systems. The reference signal can then be used to the measure time shift or sample clock period shifts induced in the interferogram signal by the OCT system. A corresponding OCT interferogram signal can then be corrected to remove the shift induced by the system based on the determination.

20 Claims, 9 Drawing Sheets

(56) References Cited

OTHER PUBLICATIONS

Jiefeng Xi, Lie Huo, Jiason Li and Xingde Li, "Generic real-time uniform K-space sampling method for high-speed swept-Source optical coherence tomography", Optics Express, vol. 18, No. 9, Apr. 26, 2010 (Apr. 26, 2010), p. 9511-9517, XP055056201, ISSN: 1094, DOI: 10.1364/OE.18.009511.

R. Huber, M. Wojtkowski, and J.G. Fujimoto, "Fourier domain mode locking (FDML): a new laser operating regime and applications for optical coherence tomography", Optics Express, OSA Publishing, US. vol. 14, No. 3, Apr. 17, 2006 (Apr. 17, 2006), pp. 3225-3237, XP002639586, ISSN: 1094-4087.

\* cited by examiner

SWEPT-SOURCE OPTICAL COHERENCE TOMOGRAPHY (SS-OCT) PHASE STABILIZATION WITH REFERENCE SIGNAL CALIBRATION

CROSS REFERENCE TO RELATED APPLICATIONS

This application claims priority to U.S. Provisional Application Ser. No. 62/327,233, filed on Apr. 25, 2016, entitled "SWEPT-SOURCE OPTICAL COHERENCE TOMOGRAPHY (SS-OCT) PHASE STABILIZATION WITH REFERENCE SIGNAL CALIBRATION", the entirety of which is incorporated herein by reference.

BACKGROUND OF THE INVENTION

Phase instability is a common problem associated with swept source optical coherence tomography (SS-OCT) systems. There are many potential causes of SS-OCT phase instability including asynchronization between the light source (e.g., a sweeping laser) in the OCT system and the electrical sweep trigger (for synchronizing the beginning of each tuning period of the light source), and trigger uncertainty inherent in the analog-to-digital conversion process. Additionally, trigger fluctuation may occur when the A-scan trigger is not synced to a specific wavelength. In this case, signal acquisition is not triggered at the same wavelength for each A-scan. Light source sweeping variation may occur when the light source does not sweep through the same optical wavelength range repeatedly every time. In those cases, the acquired signals will not have the same sampled signal. Clock asynchronizations (e.g., between an optical clock, A-scan trigger, and light source of an SS-OCT system) can create a shift in sampled signals when the clock is not perfectly synchronized to the A-scan trigger. Signal shifts may also result from data acquisition instability and timing delays.

A number of existing approaches have thus attempted to solve phase stabilization problems using a reference signal(s) acquired by a second channel or optically mixed with imaging signals. Some of these methods incorporate new elements in the OCT system or require an optical clock. One approach includes a calibration mirror corresponding to a tissue depth, so as to generate a calibration signal associated with that depth. Other methods introduce a wavelength signature signal with a fiber Bragg grating or a gas cell. Still other methods use cross-correlated corrected phase of a Mach-Zehnder Interferometer (MZI) to stabilize A-scans. Still further methods consider phase differences to generate negative cancelling signals.

Separately, multimodal OCT refers to an OCT system that has adjustable OCT imaging parameters such as imaging speed, imaging range, and imaging resolution. Parameters such as sensitivity, sampling rate, and optical wavelength range are also tied to imaging speed, imaging range, and imaging resolution, respectively. Thus, tradeoffs in these parameters exist in order to maximize performance of the OCT system. For example, with a fixed sampling rate, decreasing imaging speed (sensitivity) or imaging resolution (optical wavelength range) increases imaging range. In these multimodal OCT systems, the clock may be an optical clock including two different MZIs having different properties, selectable by a controller depending a desired operation. As a result, images taken in different modes of multimodal systems can also exhibit sampling differences between A-scans.

BRIEF SUMMARY OF THE INVENTION

The present disclosure relates to the use of a reference signal having a known induced optical delay for phase stabilization of optical coherence tomography (OCT) interferograms, and for correcting sampling differences within OCT interferograms, in single mode and multimodal OCT systems. By including a known delay, the reference signal can be used to the measure time shift or sample clock period shifts induced in the interferogram signal by the OCT system. A corresponding OCT interferogram signal can then be corrected to remove the shift induced by the system based on the determination.

According to one example, an imaging method comprises optically generating a plurality of reference signals; generating a plurality of interferogram signals with an interferometric system configured to image an object, each of the interferogram signals being generated concurrently with one of the reference signals and each of the interferogram signals being generated according to a different optical coherence tomography (OCT) imaging mode; inducing a pre-defined optical delay in at least one of the reference signals; detecting the interferogram signals and the reference signals with at least one analog-to-digital converter; stabilizing a phase of at least one of the interferogram signals; and correcting sampling differences between interferogram signals of the different OCT imaging modes, wherein the phase of the at least one interferogram signal is stabilized or the sampling differences are corrected, based at least in part on the reference signal.

According to various embodiments of the above example, the reference signals are only partially sampled or partially processed; the optical delay is induced in the at least one reference signal by an interferometer, or by a reflector in the interferometric system that generates the interferogram signal; the method further comprises phase detection, fixed amplitude crossing, or cross correlation of one of the reference signals prior to applying a Fourier transform on the corresponding interferogram signal; at least one reference signal is electrically delayed or combined with the corresponding interferogram signal; the method further comprises determining a sample wavelength, wavenumber, and/or time-wavenumber recalibration information based on at least one of the reference signals, and processing a plurality of the interferogram signals with the same optical wavelength range, based on the determined sample wavelength, wavenumber, and/or time-wavenumber recalibration information; and/or the same reference signal delay is used for at least two OCT imaging modes.

According to another example, an imaging method comprises: optically generating a plurality of reference signals; generating a plurality of interferogram signals with an interferometric system configured to image an object, each of the interferogram signals being generated concurrently with one of the reference signals; inducing a pre-defined optical delay in at least one of the reference signals; detecting the interferogram signals and the reference signals with at least one analog-to-digital converter of a data acquisition unit; stabilizing a phase of at least one of the interferogram signals; and correcting sampling differences between the interferogram signals, wherein the phase of the at least one interferogram signal is stabilized or the sampling differences are corrected based at least in part on phase detection of the reference signal prior to applying a Fourier transform on the corresponding interferogram signal.

According to various embodiments of the above example, the interferogram signals and/or the reference signals are detected without reference to an optical clock; the interferogram signals and/or the reference signals are detected with reference to an optical clock; the reference signals are only partially sampled or partially processed; the optical delay is induced in the at least one reference signal by an interferometer, or by a reflector in the interferometric system that generates the interferogram signal; at least one reference signal is electrically delayed or combined with the corresponding interferogram signal; the method further comprises determining a sample wavelength, wavenumber, and/or time-wavenumber recalibration information based on at least one of the reference signals, and processing a plurality of the interferogram signals with the same optical wavelength range, based on the determined sample wavelength, wavenumber, and/or time-wavenumber recalibration information; and/or the same reference signal delay is used for at least two OCT imaging modes.

DETAILED DESCRIPTION OF THE DRAWINGS

Phase stabilized OCT systems allow phase-sensitive measurements and imaging such as Doppler, power Doppler, phase variance, optical microangiography (OMAG), and polarization sensitive OCT (PS-OCT). Phase stabilization also enables removing fixed pattern noise through background subtraction during OCT signal processing. The present disclosure relates to methods and apparatuses capable of addressing the above-described phase-jittering problem in OCT systems, including for multimodal SS-OCT systems, as well as overcoming limitations of the above-described current methods.

A system and method according to the above are now described. In brief, the present disclosure relates to methods and systems for correcting phase of OCT interferogram signals. The method concurrently generates a reference signal having a known optical delay corresponding to an imaging depth and a corresponding OCT interferogram signal. The reference signals having the known delay and the OCT interferogram signals can then be analyzed and compared to each other and the known induced delay to determine the actual delays and instability inherently induced by the system. The difference in the known and detected delays indicates the actual phase shift or sample clock period shifts induced in the interferogram signal by the OCT system. The OCT interferogram signal can then be corrected to remove the shift induced by the system.

Figure 1:
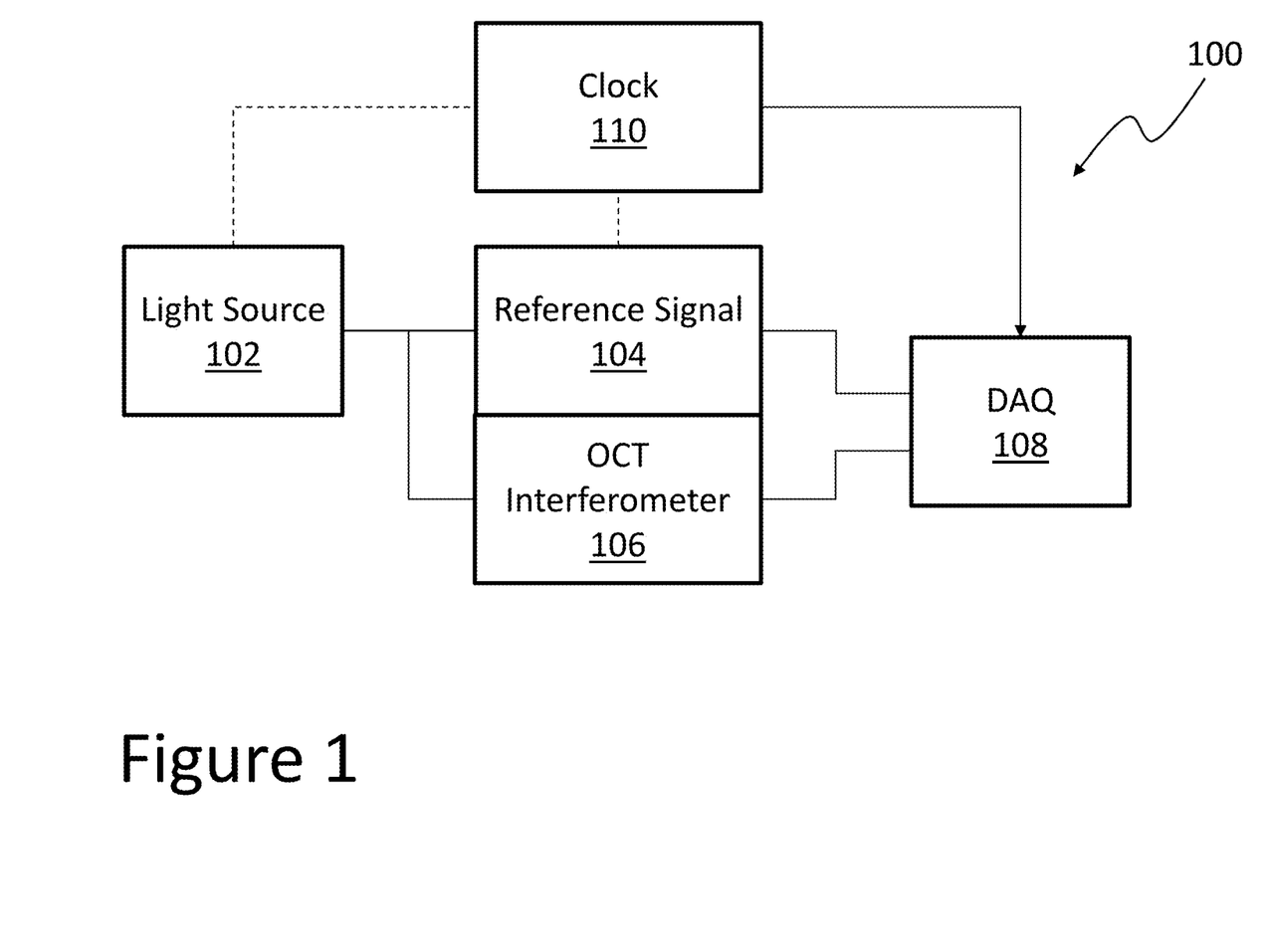
FIG. 1 illustrates an example OCT system described herein.

A description of example systems used to implement the above now follows. FIG. 1 illustrates an example OCT system 100 including a light source 102, a reference signal subsystem 104, an OCT interferometric subsystem 106, and a data acquisition unit 108 (e.g., including an analog-to-digital converter and being connected to a computer or other processor for signal processing). The light source 102 may be a sweeping light source, multimodal light source, or similar laser, and provides an optical input to the reference signal subsystem 104 and the OCT interferometric subsystem 106.

The reference signal subsystem 104 and OCT interferometric subsystem 106 are optical systems. Each subsystem 104, 106 includes a photodetector (or together use a shared photodetector), such as a balanced detector. The reference signal subsystem 104 generates a reference signal having a known delay, as described in more detail below. The OCT interferometric subsystem 106 generates an OCT interferogram signal of an imaged object. The output of the photodetectors is an electrical signal corresponding to the optical signal of the respective system detected by the photodetector. The electrical signal is then input to the data acquisition unit 108, which includes an analog-to-digital converter. The data acquisition unit 108 may process the electrical signal before or after analog-to-digital conversion, and provide the output of the analog-to-digital converter to a subsequent processor (not shown) for further processing. In some embodiments a clock 110 outputs a signal as an input to the data acquisition unit 108. This clock signal may be used as the clock for analog-to-digital conversion or other processing in the data acquisition unit 108. In other embodiments, the clock may be internal to the data acquisition unit 108 and analog-to-digital converter at a fixed frequency, for example as part of a multimodal light source. In these embodiments, the internal clock may be provided as an alternative to, or in addition to, an external k-clock (generating an optical clock signal based on a wavenumber of light output by the light source) for each light source operating mode. For systems having both a non-optical clock and optical clock, the same reference signal configuration can be used for phase stabilization in multiple modes, where those modes are either non-optically or optically clocked.

Figure 2:
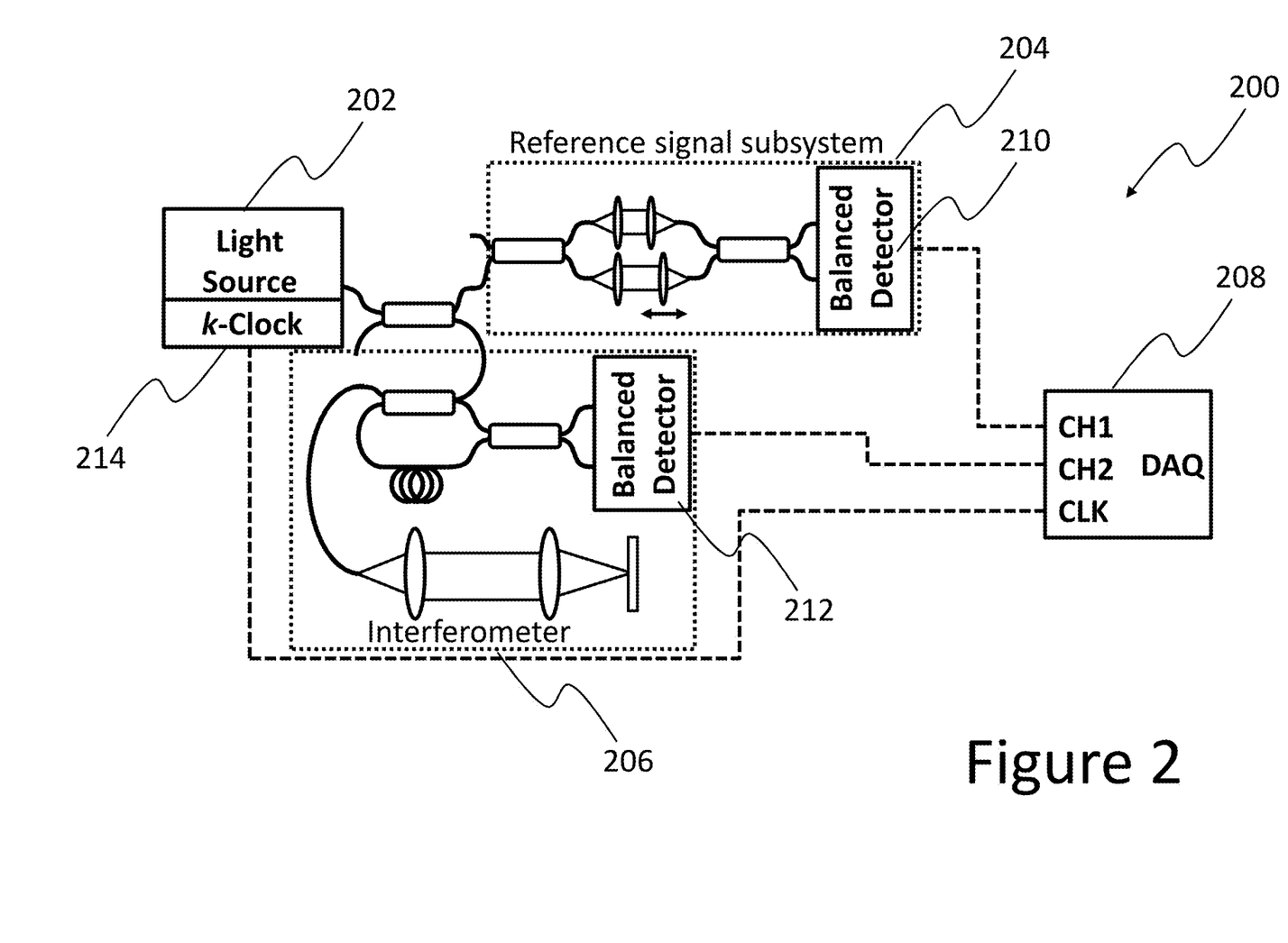
FIG. 2 illustrates an example OCT system having an independent k-clock.
Figure 3:
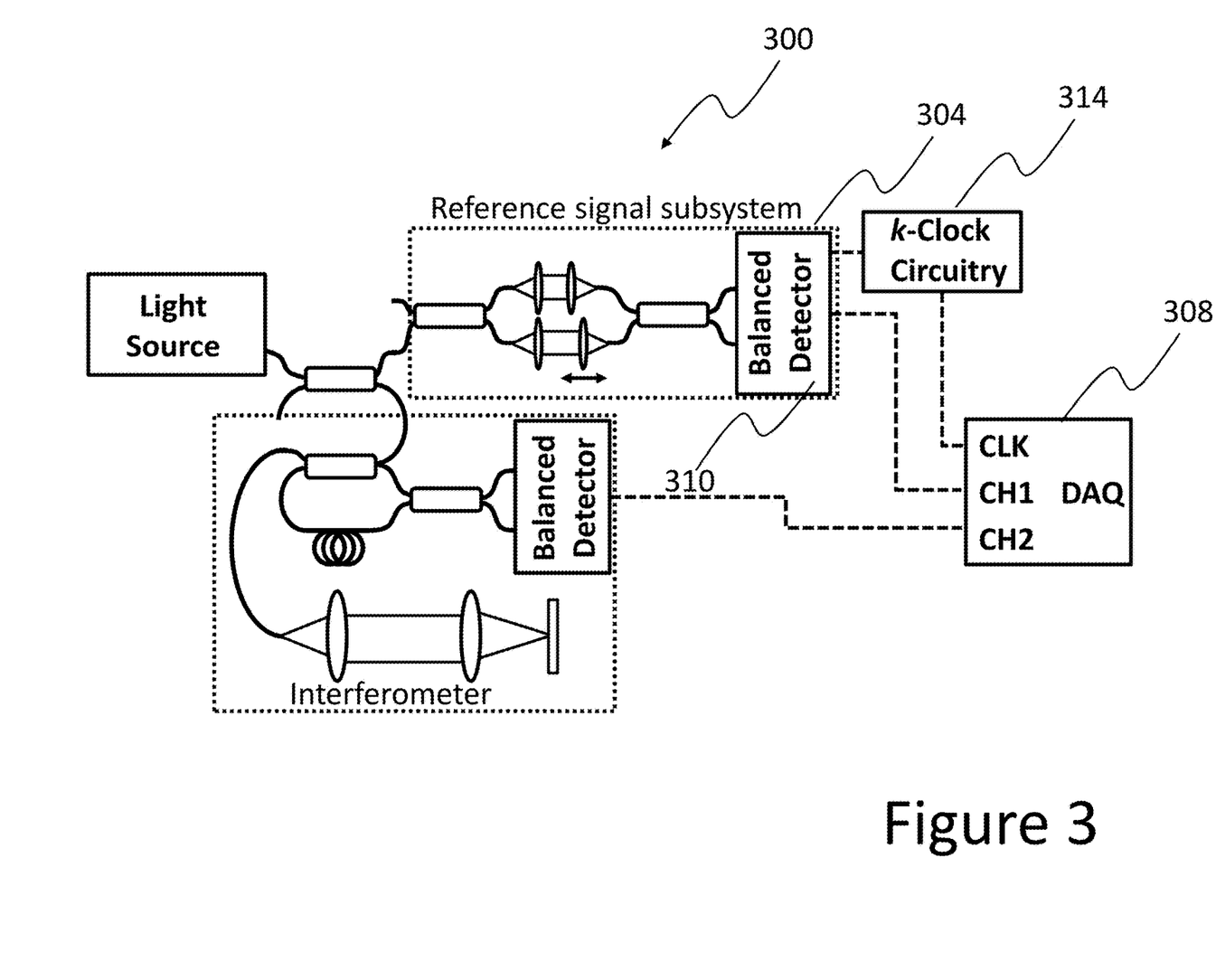
FIG. 3 illustrates an example OCT system having a k-clock that is dependent on a reference signal.

FIGS. 2-7 illustrate, in further detail, examples of OCT systems herein. In the example of FIG. 2, the reference signal subsystem 204 generates an optical reference signal, which is detected by balanced detector 210 and output as an electrical signal to the data acquisition unit 208. While the reference signal portion 204 is illustrated as a Mach-Zehnder Interferometer, it is noted that a Michelson Interferometer, Fabry-Perot Interferometer, reflector in OCT interferometer (e.g., as described below with reference to FIG. 4), or the like may also be used to generate the reference signal. The OCT interferometric subsystem generates an OCT interferogram signal which is also output as an electrical signal to the data acquisition unit 208 from balanced detector 212. As illustrated in FIG. 2, the clock is an external k-clock 214, which generates a clock signal independently of the reference signal subsystem 204. Here, the data acquisition unit 208 receives inputs on three input channels: 1) an electrical signal corresponding to the optical reference signal; 2) an electrical signal corresponding to the optical interferometric signal; and 3) a clock signal.

The examples of FIGS. 3-7 are substantially similar to that of FIG. 2 and therefore descriptions of common elements are omitted. The OCT system 300 of FIG. 3 has an external k-clock 314 that receives as an input the output from balanced detector 310 of the reference signal subsystem 304. In this manner, the k-clock 314 generates a multiplied clock signal based on the reference signal generated by the reference signal subsystem 304. This signal is then supplied to the data acquisition unit 308.

Figure 4:
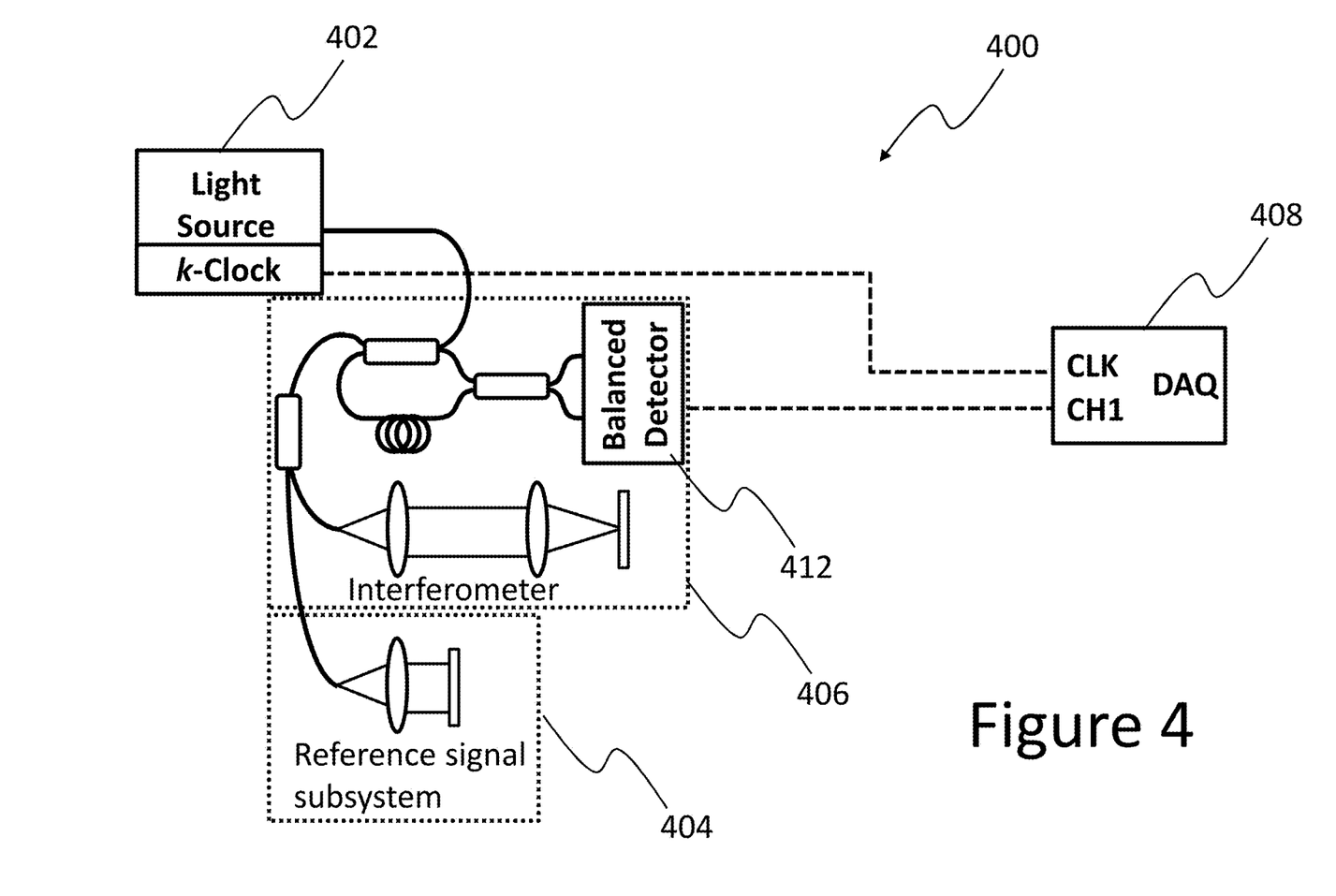
FIG. 4 illustrates an example OCT system having a reference signal subsystem optically integrated with an OCT interferometric subsystem.

With further regard to embodiments of a reference signal subsystem, FIG. 4 illustrates an example OCT system 400 having a reference signal subsystem 404 that is optically integrated with the OCT interferometric subsystem 406. In this example, the reference signal subsystem 404 is embodied as reflector in the OCT interferometer. As can be seen, the output of the light source 402 is split into an imaging arm and a reference arm, as with a traditional OCT interferometer. However, the light source 402 output is further split into a second reference arm that serves as the reference signal subsystem 404. The reflection of light from the reflector of the reference signal subsystem 404 is then combined with that from the reference arm and imaging arms and detected by the balanced detector 412 of the OCT interferometric subsystem 406. An electrical signal having the OCT interferogram and reference signal components is then output from balanced detector 412 to the data acquisition unit 408 as a single channel input. However, in other embodiments, the light reflected by the reflector in the reference signal subsystem 404 may be provided to a balanced detector unique to the reference signal subsystem 404 rather than the balanced detector 412 of the OCT interferometric subsystem 406.

Figure 5:
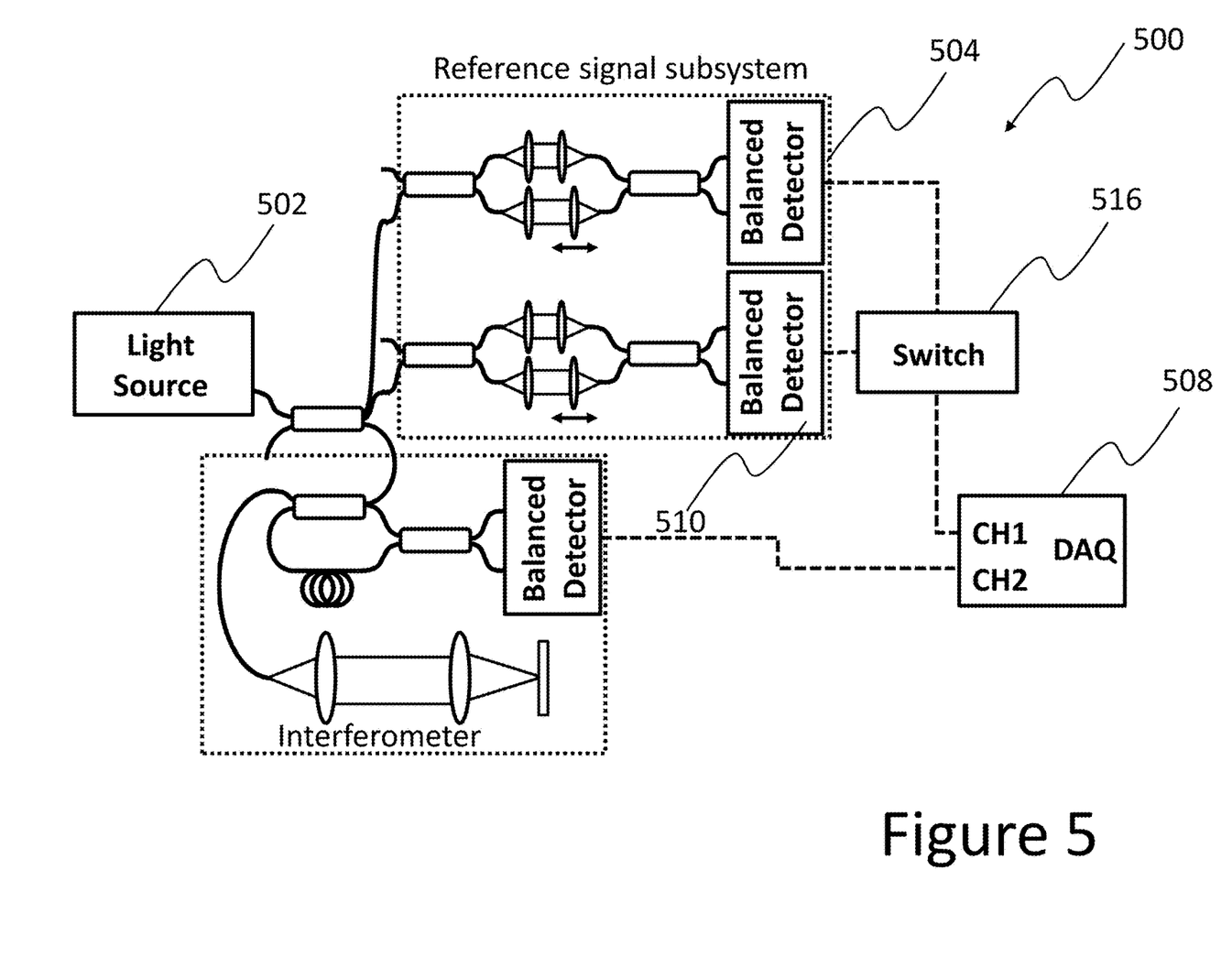
FIG. 5 illustrates an example OCT system having multiple Mach-Zehnder interferometers for multiple light source modes.
Figure 6:
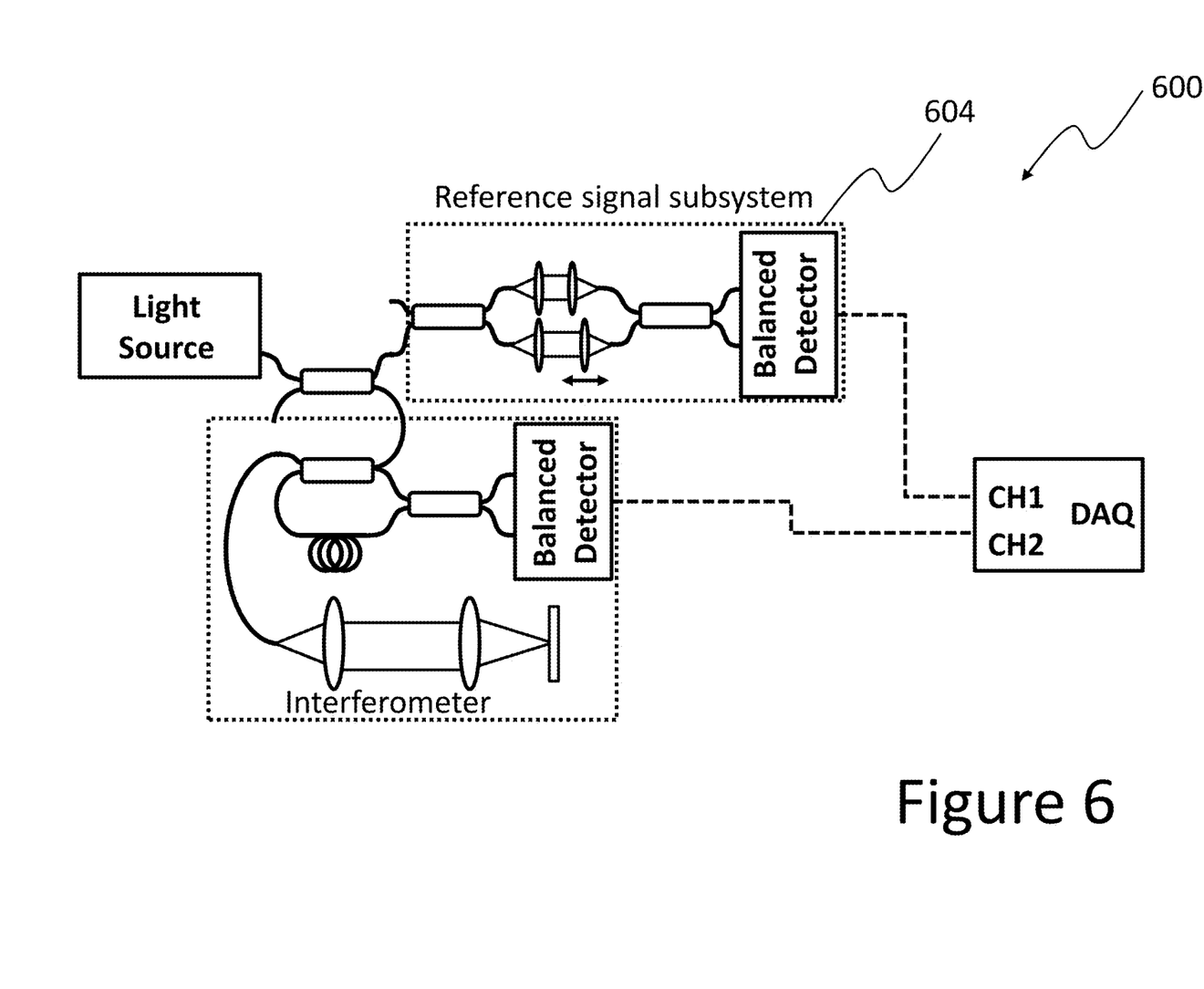
FIG. 6 illustrates an example OCT system having a single Mach-Zehnder interferometers for multiple light source modes.

In some embodiments, the reference signal subsystem can be used to generate reference signals for different SS-OCT operating modes of a multimodal OCT system. For example, FIG. 5 illustrates an OCT system 500 having a reference signal subsystem 504 with two Mach-Zehnder interferometers (MZI). Each of the MZIs is configured for a different operating mode of the OCT system 500, and includes its own balanced detector 510. The outputs of the balanced detectors 510 are provided to a switch 516, which selects the reference signal corresponding to the current mode, and provides that signal to the data acquisition unit 508.

Of course, implementation of reference signal subsystems for multimodal systems is not limited to the MZIs illustrated in FIG. 5. Some embodiments may utilize other interferometers or reflectors in the OCT interferometer may be used. Further, embodiments may include more than two MZIs, depending on the number of modes of the multimodal system. In some embodiments, a unique reference signal (e.g., from a unique MZI) is generated for each mode. In other embodiments, such as that illustrated in FIG. 6, a single reference signal (generated by a single MZI) in the reference signal subsystem 604 may be used for multiple modes.

Figure 7:
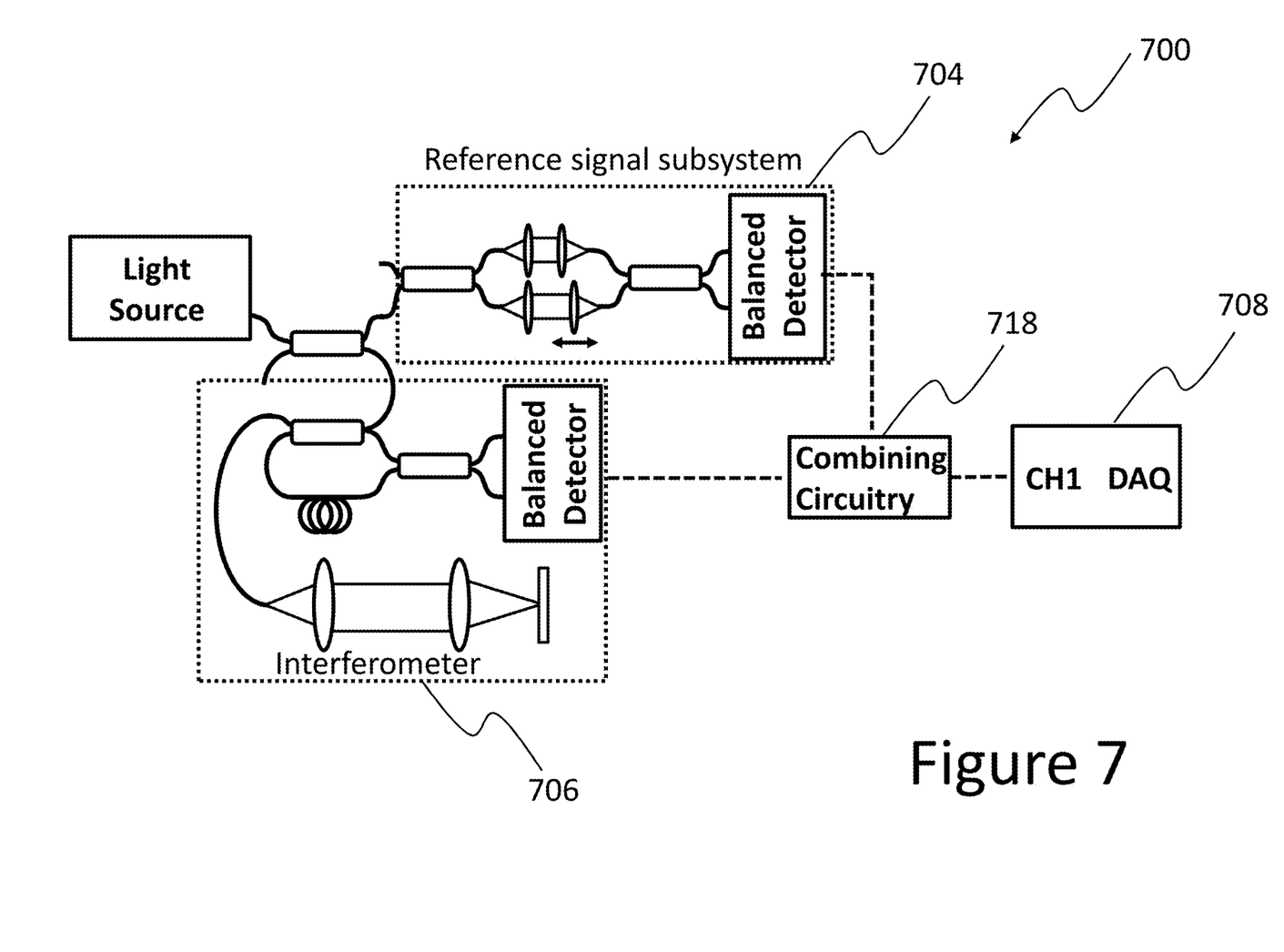
FIG. 7 illustrates an example OCT system having combining circuitry for electrically combining reference and OCT interferogram signals.

The example OCT system 700 of FIG. 7 illustrates combining circuitry 718 that receives the electrical outputs from the reference signal subsystem 704 and OCT interferometric subsystem 706. Here, the combining circuitry combines the reference and OCT signals to produce a single output provided to the data acquisition unit 708. The combined output can thus be detected using a single channel data acquisition unit.

The reference signal subsystems herein are also capable of correcting sample shifts and sub-sample off sync data, as well as calibrating time to k (where k=wavenumber $\propto 1$/wavelength) space. Thus, the reference signal can be used for phase stabilization in multiple modes and a time-wavenumber calibration can be generated from the reference signal. These calibrations can be used so that each signal is processed or sampled with the same optical wavelength range, based on a determined sample wavelength, wavenumber, and/or time-wavenumber recalibration information of the calibration. The reference signal may be generated with or without wavelength marks such as those provided by fiber Bragg gratings (FBGs) or gas cells. The wavelength marks can be separately detected as a signature signal, for example, as a trigger signal, or acquired independently, or mixed into other signals. Thus, some embodiments may include FGBs or gas cells in the optical lines of the reference signal subsystem. Still other embodiments could include additional reference or signature signals.

The systems described herein can be used for single or multimodal OCT applications and in both cases, can be implemented, for example, with k-clock acquisition, fixed time-wavenumber calibration, a linearized time-wavenumber relationship, and/or with a light source trigger and/or optical trigger such as a wavelength trigger or signature signal generated from FBGs or gas cells. In each of these embodiments and combinations of embodiments, the above-described method for phase-stabilization can be applied.

Figure 8:
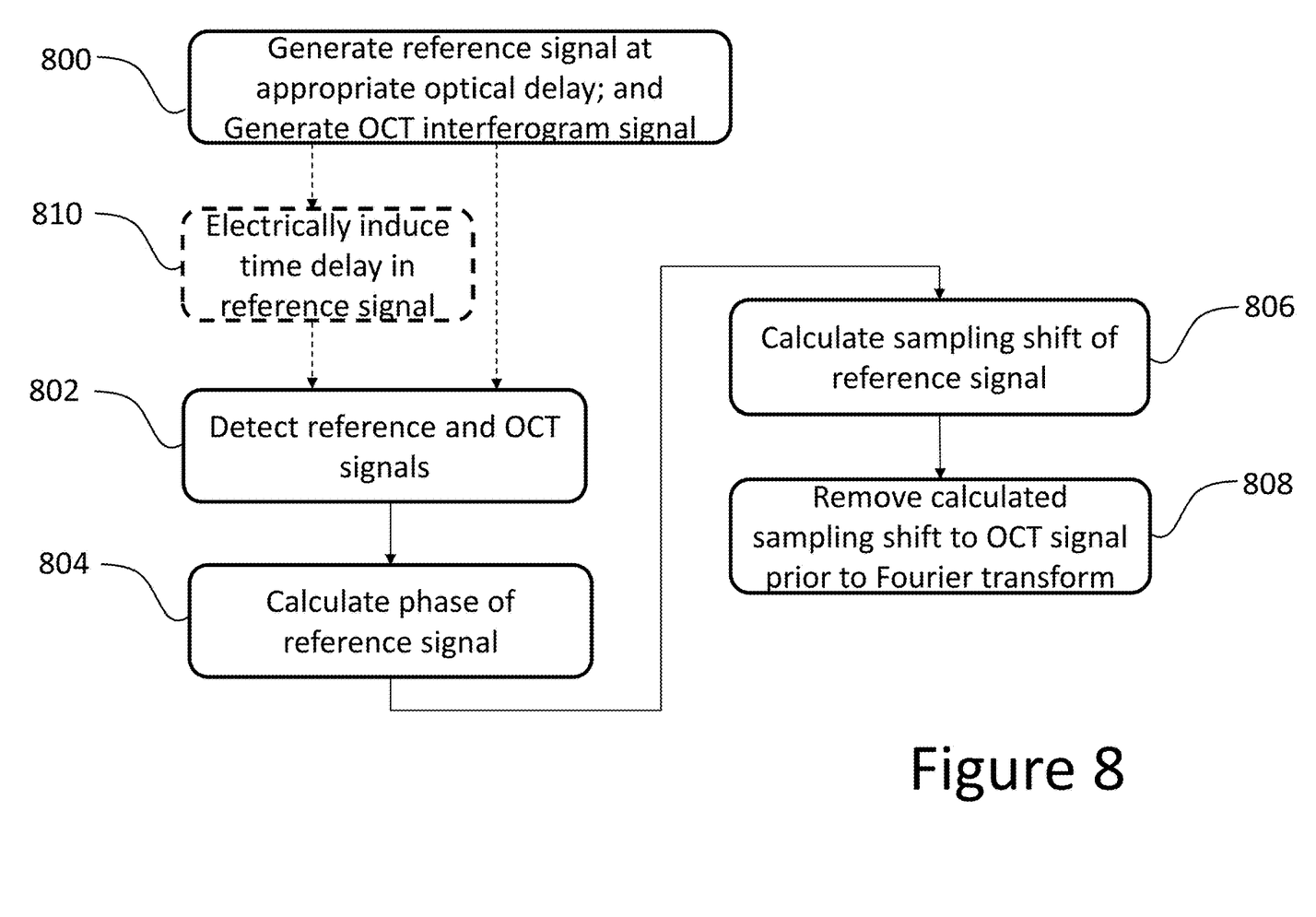
FIG. 8 illustrates an example method described herein.

FIG. 8 illustrates an example method for using phase shift detection for correcting OCT interferogram signals based on reference signals generated, for example, by the reference signal subsystems and OCT systems described above. According to the method, first a reference signal is generated 800 having a pre-determined known optical delay corresponding to an imaging depth. This signal and delay may be generated by a reference signal subsystem as described above. For example, the reference signal is generated by an interferometer such as a Mach-Zehnder Interferometer (MZI), Michelson Interferometer, or Fabry-Perot Interferometer, a reflector in the OCT interferometer that produces the OCT interferogram signal, or the like. After the reference signal has been detected by the photodetector and converted to an electrical signal, a time delay may then optionally be electrically induced 810 in the reference signal. For example, the reference signal may be shifted by a known number of samples, where the sample number shift corresponds to the product of the desired time delay and the sampling rate. These optical and time delays generated in the reference signal may be pre-defined in the design of the OCT system, or otherwise known, and are separate from any delays and phase shifts inherently induced by the system (e.g., by the k-clock, light source, data acquisition unit).

Concurrently, a corresponding OCT interferogram signal (e.g., from imaging an object) is generated. The OCT interferogram signal may be generated by an OCT interferometric subsystem as described above. While concurrent generation of the reference and OCT interferogram signals does not strictly require that the signals be generated simultaneously at exactly the same time, the concurrent generation of the reference and OCT interferogram signals should render signals that have a same induced inherent system instability such that analysis of the reference signal can be applied as a correction to the interferogram signal. Put another way, should the instability of the system be a function of time, the reference and OCT interferogram signals should be generated at about the same time so as to induce similar instabilities in both signals. However, if the instability is not strongly affected by time, the reference and OCT interferogram signals need not be generated at the same time. Indeed, according to some embodiments, the same reference signal may be used for a plurality of OCT interferogram signals. Further, by concurrently generating the reference and OCT interferogram signals, the reference signal may be electrically combined and delayed with the OCT interferogram signal after their detections by photodetectors. An example of a system for this combination is provided in FIG. 7.

Then, the electrical reference signal is detected 802 (e.g., by an analog-to-digital converter in a data acquisition unit) along with the corresponding electrical OCT interferogram signal, as part of normal imaging. In this sense, each detected reference signal has a corresponding detected OCT interferogram signal that was concurrently generated. The reference signal's phase and sampling shift are then calculated 804, 806. The calculated sampling shift can then be removed from the detected OCT interferogram signal prior to performing a Fourier transform 808.

Because the Nyquist imaging depth $z_{Ny}$ is fixed depending on the light source operating mode of the OCT system, the optical delay of the reference signal is selected to eliminate ambiguities for each operating mode. In other words, the delay is selected to be within or less than the imaging depth of the OCT interferometer. Examples for calculating the phase and sampling shift of the reference signal for externally optically clocked and internally or fixed-frequency non-optically clocked OCT systems follow.

For systems that are optically clocked (e.g., with a k-clock external to an analog-to-digital converter of a data acquisition unit), the interference signal detected by the OCT system may be expressed as $S(k=2\pi/\lambda) \sim P_z(k)\cos(2\,kz+\Phi_z)$, where $S(k)$ is the detected optical power signal at wavenumber k, $P_z(k)$ is the reflected power of the signal at position z, and $\Phi_z$ is the phase of this reflection. SS-OCT sync and fluctuation can induce a phase shift according to $$\Delta\Phi_z = n\pi\frac{z}{z_{Ny}} + \Delta\varepsilon,$$

where n is the number of sample clock periods, $z_{Ny}$ is the Nyquist limited imaging depth, and $\Delta\varepsilon$ is the residual delay due to the difference between the trigger signal and the sampling clock.

For a detected reference signal, the maximum detectable phase shift $\Delta\Phi_z$ is $+\pi$ and the minimum detectable phase shift $\Delta\Phi_z$ is related to the phase noise standard deviation $$\sigma_{\Delta\Phi_{min}} = \sqrt{\frac{1}{2}\left(\frac{1}{SNR_z}\right)},$$

where $$SNR_z = \frac{\eta P_z}{h\nu f_A} = \frac{\rho P_z \Delta t}{e},$$

where $f_A$ is the sweep repetition rate, $\eta$ is the detector sensitivity, hv is the single photon energy, $\Delta t$ is the sweep period, $\rho$ is the detector responsivity, and e is the quantum of electric charge. An appropriate optical delay is thus determined at position/depth z so that $\sigma_{\Delta\Phi_{min}} < |\Delta\Phi_z| < \pi$. Only a partial reference signal is needed to obtain $\Delta\Phi_z$. Thus, the reference signal does not have to be sampled or processed over the entire tuning range and some embodiments of the present disclosure can utilize only a partially sampled or partially processed reference signal.

Since there is typically no phase drift due to non-integer swept source and sample clock mismatch in optically clocked scenarios, the detected $\Delta\Phi_z$ of the reference signal can be used to calculate the number of sample clock period shifts n induced by the system in both the reference signal and corresponding interferogram signal according to the relationship $$\Delta\Phi_z = n\pi\frac{z}{z_{Ny}},$$

where n is the number of sample clock periods and $z_{Ny}$ is the Nyquist limited imaging depth.

Once the phase shift and sample clock period shifts are determined for the reference signal, equal shifts can be subtracted from the corresponding OCT interferogram signal, thereby removing the system induced phase shift. This phase shift correction can be applied prior to performing a Fourier transform on the interferogram signal.

In the event that there is sampling instability in addition to the number of sample clock period shifts, it is possible to resample the OCT interferogram signal using the detected phase shift $\Delta\Phi_z$ to set the time-wavenumber recalibration. Such a time-wavenumber recalibration can be used so that all OCT interferogram signals are processed with the same optical wavelength range.

For non-optically clocked OCT systems (e.g., with a fixed-frequency clock internal to an analog-to-digital converter of a data acquisition unit), rather than calculating the sample shift n, the phase shift $\Delta\Phi_z$ can be used directly as a reference to set time-wavenumber recalibration so that all interference signals are processed with the same optical wavelength range. Phase stabilization is then achieved through reference signal phase detection, fixed amplitude crossing, or cross correlation of the reference signal between the reference signals, prior to performing a Fourier transform. Using an FBG or signature signal by itself does not provide a continuous phase for time-wavenumber recalibration and having an electrical FBG trigger would still result in sub-sample ambiguity (e.g. due to asynchrony between a light source and analog-to-digital converter clocks). Thus such elements alone would be insufficient for phase stabilization. However, these elements could still additionally be included in an OCT system described herein to aid calculation or limit sample shifts. Because phase stabilization here is performed prior to the Fourier transform, different optical wavelength ranges need not be detected, information need not be substantially excluded, and phase subtraction need not be performed on the resulting OCT image.

For multimodal imaging, an appropriate phase reference can be calculated for each mode $$\left(\text{i.e., } \Delta\Phi_z = n\pi\frac{z}{z_{Ny}} + \Delta\varepsilon\right).$$

The minimum depth z corresponding to the optical delay for the reference signal is defined by its OCT signal bandwidth. The signal should not overlap with the low-frequency DC components of the interference signal. As $z_{Ny}$ increases, $\Delta\Phi_z$ decreases closer to $\sigma_{\Delta\Phi min}$. As $z_{Ny}$ decreases, $\Delta\Phi_z$ approaches $\pm\pi$. Therefore it is desirable to select an appropriate z according to system synchronization and fluctuations which determine n and $\Delta\varepsilon$.

In various embodiments, the same reference signal configuration (a reference signal generated with the same depth z optical delay) can be used for more than one OCT imaging mode in multimodal imaging. However, it is also envisioned that reference signals can be generated that are unique to individual modes of the multimodal systems. The determined phase shift $\Delta\Phi_z$ here can similarly be used to correct sampling differences within OCT interferogram signals of different imaging modes—that is, for example, by subtracting the determined sample clock period shift from the corresponding OCT interferogram.

Figure 9:
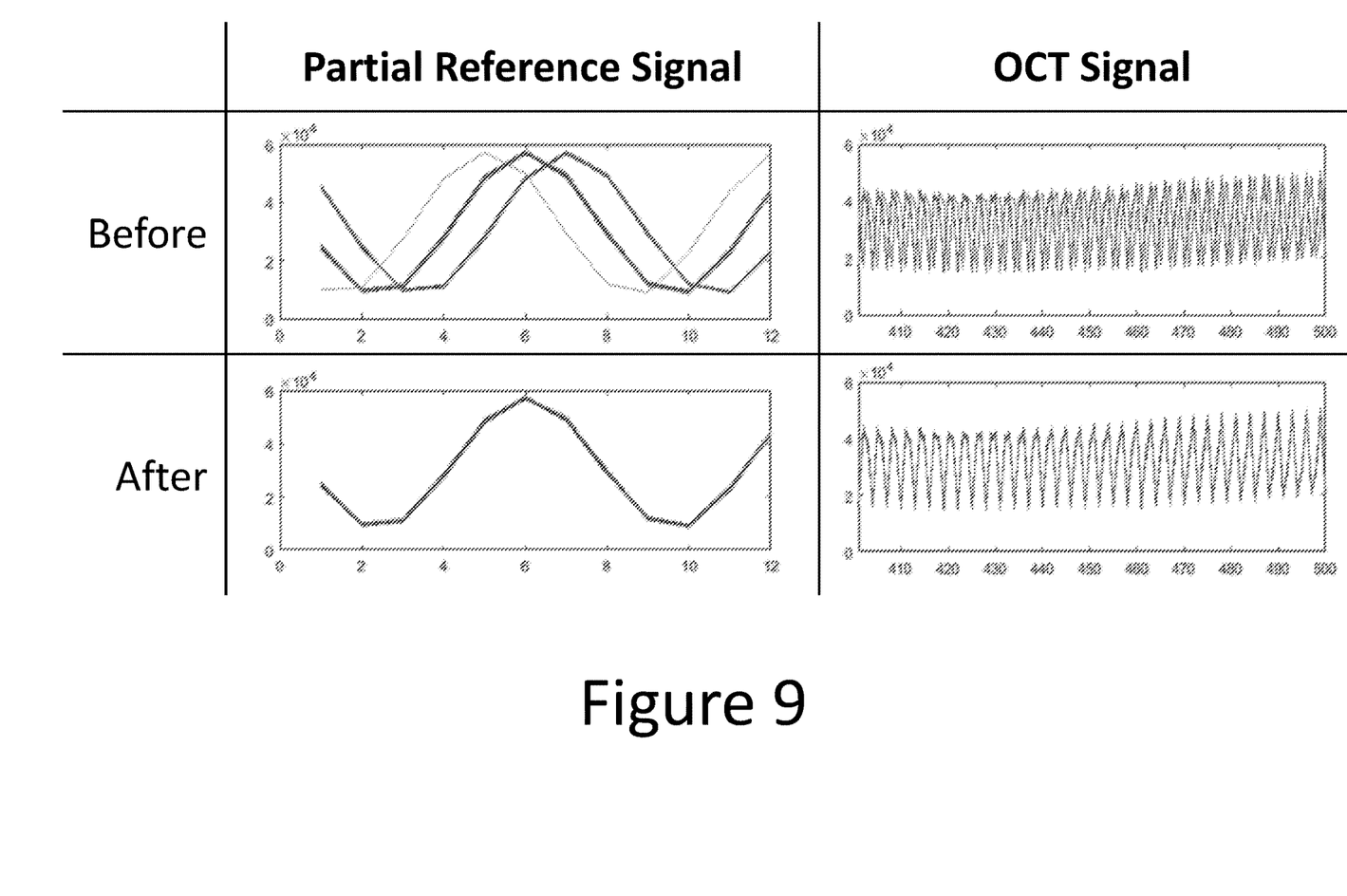
FIG. 9 illustrates results of phase stabilization according to the present disclosure.

FIG. 9 illustrates example reference and OCT interferogram signals from a partially sampled or partially processed reference signal system, before and after phase stabilization, according to the above-described method and systems. As can be seen, three reference signals and the corresponding OCT interferogram signals are out of phase prior to application of the above-described phase stabilization technique. Following phase stabilization, the reference signals and OCT interferogram signals overlap each other and are in phase.

The various embodiments described herein refer to imaging obtained from OCT systems, and more specifically, imaging of an eye. However, the disclosed techniques and processes may equally apply to imaging data obtained using other types of imaging devices, for example ultrasound, and for other imaging data related to objects other than the eye.

It is also to be noted that the above aspects, embodiments, and examples are envisioned to be implemented automatically via hardware and/or software by a processor. A "processor" as used herein refers to any, or part of any, electrical circuit comprised of any number of electrical components, including, for example, resistors, transistors, capacitors, inductors, and the like. The circuit may be of any form, including, for example, an integrated circuit, a set of integrated circuits, a microcontroller, a microprocessor, a collection of discrete electronic components on a printed circuit board (PCB) or the like. The processor may be able to execute instructions stored in some form of memory, either volatile or non-volatile, such as random access memories, flash memories, digital hard disks, and the like. The processor may also stand alone or be part of a computer used for operations other than processing image data. It should be noted that the above description is non-limiting, and the examples are but only a few of many possible processors envisioned.

What is claimed is:

1. An imaging method, comprising:
   optically generating a plurality of reference signals;
   generating a plurality of interferogram signals with an interferometric system configured to image an object, each of the interferogram signals being generated concurrently with one of the reference signals and each of the interferogram signals being generated according to a different optical coherence tomography (OCT) imaging mode;
   inducing a pre-defined optical delay in at least one of the reference signals;
   detecting the interferogram signals and the reference signals with at least one analog-to-digital converter;
   stabilizing a phase of at least one of the interferogram signals; and
   correcting sampling differences between interferogram signals of the different OCT imaging modes,
   wherein the phase of the at least one interferogram signal is stabilized or the sampling differences are corrected, based at least in part on the reference signal, and
   wherein the optical delay corresponds to an imaging depth where an absolute value of a detectable phase shift at the imaging depth is less than $\pi$ and greater than a standard deviation of the phase noise.

2. The method according to claim 1, wherein the reference signals are only partially sampled or partially processed.

3. The method according to claim 1, wherein the optical delay is induced in the at least one reference signal by an interferometer, or by a reflector in the interferometric system that generates the interferogram signal.

4. The method according to claim 1, further comprising phase detection, fixed amplitude crossing, or cross correlation of one of the reference signals prior to applying a Fourier transform on the corresponding interferogram signal.

5. The method according to claim 1, wherein at least one reference signal is electrically delayed or combined with the corresponding interferogram signal.

6. The method according to claim 1, further comprising:
   determining a sample wavelength, wavenumber, and/or time-wavenumber recalibration information based on at least one of the reference signals; and
   processing a plurality of the interferogram signals with the same optical wavelength range, based on the determined sample wavelength, wavenumber, and/or time-wavenumber recalibration information.

7. The method according to claim 1, wherein the same reference signal delay is used for at least two OCT imaging modes.

8. An imaging method, comprising:
   optically generating a plurality of reference signals;
   generating a plurality of interferogram signals with an interferometric system configured to image an object, each of the interferogram signals being generated concurrently with one of the reference signals;
   inducing a pre-defined optical delay in at least one of the reference signals;
   detecting the interferogram signals and the reference signals with at least one analog-to-digital converter;
   stabilizing a phase of at least one of the interferogram signals; and
   correcting sampling differences between the interferogram signals,
   wherein the phase of the at least one interferogram signal is stabilized or the sampling differences are corrected based at least in part on phase detection of the reference signal prior to applying a Fourier transform on the corresponding interferogram signal,
   wherein the interferogram signals and/or the reference signals are detected without reference to an optical clock, and
   wherein the optical delay corresponds to an imaging depth where an absolute value of a detectable phase shift at the imaging depth is less than $\pi$ and greater than a standard deviation of the phase noise.

9. The method according to claim 8, wherein the reference signals are only partially sampled or partially processed.

10. The method according to claim 8, wherein the optical delay is induced in the at least one reference signal by an interferometer, or by a reflector in the interferometric system that generates the interferogram signal.

11. The method according to claim 8, wherein at least one reference signal is electrically delayed or combined with the corresponding interferogram signal.

12. The method according to claim 8, further comprising:
determining a sample wavelength, wavenumber, and/or time-wavenumber recalibration information based on at least one of the reference signals; and
processing a plurality of the interferogram signals with the same optical wavelength range, based on the determined sample wavelength, wavenumber, and/or time-wavenumber recalibration information.

13. The method according to claim 8, wherein the same reference signal delay is used for at least two OCT imaging modes.

14. An imaging method, comprising:
optically generating a plurality of reference signals;
generating a plurality of interferogram signals with an interferometric system configured to image an object, each of the interferogram signals being generated concurrently with one of the reference signals;
inducing a pre-defined optical delay in at least one of the reference signals;
detecting the interferogram signals and the reference signals with at least one analog-to-digital converter;
stabilizing a phase at least one of the interferogram signals; and
correcting sampling differences between the interferogram signals,
wherein the phase of the at least one interferogram signal is stabilized or the sampling differences are corrected, based at least in part on the corresponding reference signal or corresponding reference signals,
wherein the interferogram signal and/or the reference signal are detected with reference to an optical clock, and
wherein the optical delay corresponds to an imaging depth where an absolute value of a detectable phase shift at the imaging depth is less than $\pi$ and greater than a standard deviation of the phase noise.

15. The method according to claim 14, wherein the reference signals are only partially sampled or partially processed.

16. The method according to claim 14, wherein the optical delay is induced in the at least one reference signal by an interferometer, or by a reflector in the interferometric system that generates the interferogram signal.

17. The method according to claim 14, further comprising phase detection, fixed amplitude crossing, or cross correlation of at least one of the reference signals prior to applying a Fourier transform on the corresponding interferogram signal.

18. The method according to claim 14, at least one reference signal is electrically delayed or combined with the corresponding interferogram signal.

19. The method according to claim 14, further comprising:
determining a sample wavelength, wavenumber, and/or time-wavenumber recalibration information based on at least one of the reference signals; and
processing a plurality of the interferogram signals with the same optical wavelength range, based on the determined sample wavelength, wavenumber, and/or time-wavenumber recalibration information.

20. The method according to claim 14, wherein the same reference signal delay is used for at least two OCT imaging modes.

* * * * *